United States Patent [19]
Elliott

[11] Patent Number: 4,892,571
[45] Date of Patent: Jan. 9, 1990

[54] EQUIPMENT AND METHOD TO REMOVE PARTICULATE AND DISSOLVED PARTICLES FROM STEAM

[76] Inventor: Robert H. Elliott, 6027 Cannon Hill Rd., Fort Washington, Pa. 19034

[21] Appl. No.: 233,360

[22] Filed: Aug. 18, 1988

[51] Int. Cl.⁴ .............................................. B01D 45/12
[52] U.S. Cl. ......................................... 55/458; 55/319; 55/462; 55/465
[58] Field of Search .................... 55/1, 17, 447, 450, 55/458, 462, 463, 465, 319

[56] References Cited

U.S. PATENT DOCUMENTS

| | | | |
|---|---|---|---|
| 324,575 | 8/1885 | Mertsheimer et al. | 55/465 X |
| 537,645 | 4/1895 | Parker | 55/447 X |
| 677,357 | 7/1901 | Hyde | 55/458 X |
| 710,654 | 10/1902 | Angell | 55/465 X |
| 969,170 | 9/1910 | Lindstrom | 55/462 X |
| 1,154,549 | 9/1915 | St. John | 55/462 X |
| 1,234,316 | 7/1917 | Elliott | 55/462 |
| 1,537,690 | 5/1925 | Portham et al. | 55/450 |
| 1,567,712 | 12/1925 | Cookson | 55/463 X |
| 1,680,255 | 8/1928 | Poston | 55/465 |
| 1,703,917 | 3/1929 | Alexander | 55/450 X |
| 1,981,549 | 11/1934 | Hawley | 55/450 X |
| 2,205,336 | 6/1940 | Beach | 55/462 X |
| 2,537,346 | 1/1951 | Henszey | 55/447 X |
| 2,562,484 | 7/1951 | Cross | 55/1 X |
| 2,709,501 | 5/1955 | Toth et al. | 55/450 |
| 2,804,169 | 8/1957 | Olah | 55/450 |

FOREIGN PATENT DOCUMENTS

| | | | |
|---|---|---|---|
| 980780 | 12/1982 | U.S.S.R. | 55/465 |
| 982717 | 12/1982 | U.S.S.R. | 55/465 |
| 1139474 | 2/1985 | U.S.S.R. | 55/447 |

Primary Examiner—Robert Spitzer
Attorney, Agent, or Firm—Frederick J. Olsson

[57] ABSTRACT

Equipment takes in steam from a boiler and expands same to form water droplets. A baffle causes steam and droplets to swirl. Solubles are dissolved by droplets and insolubles separate. Both are collected by a receiver.

7 Claims, 1 Drawing Sheet

EQUIPMENT AND METHOD TO REMOVE PARTICULATE AND DISSOLVED PARTICLES FROM STEAM

This invention in general relates to steam boilers which supply live steam for such applications as heat exchangers employed in various industrial processes, steam turbines, space heaters, and radiators employed for heating commercial and industrial buildings. More particularly, the invention relates to equipment for connection to the steam exit of a boiler which functions to remove dissolved and undissolved particles or solids so that when the steam is condensed by use at the application site, the resulting water will have a high degree of purity.

The steam normally exiting from a boiler has many undesirable impurities among the most undesirable and harmful impurities are the sodium compounds, ammonium compounds particularly amines to protect steam lines, and calcium. The steam normally contains both soluable and insoluable particles, the latter being referred to as particulate. The collective, unwanted affect of the impurities is to cause deterioration of equipment due to chemical reactions, to impair the function and efficiency of equipment due to the development of impeding film, and to render the condensed water relatively valueless for an application except for returning to the boiler.

The principle objective of the invention is to provide impurity removal structure and a method which will substantially reduce the above unwanted effects. The basic structure is such that it can be made dimensionally compatible with any size boiler.

The invention will be described below in connection with the following drawings wherein.

Figure 2:
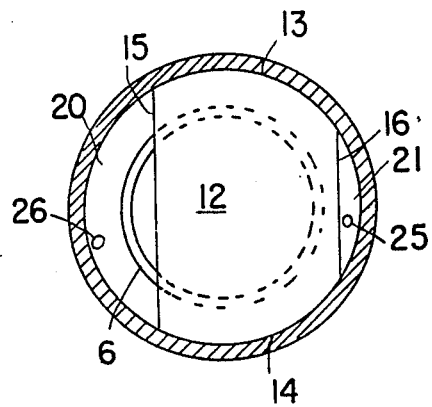
FIG. 2 is a view taken along the lines 2-2 of FIG. 1.
Figure 1:
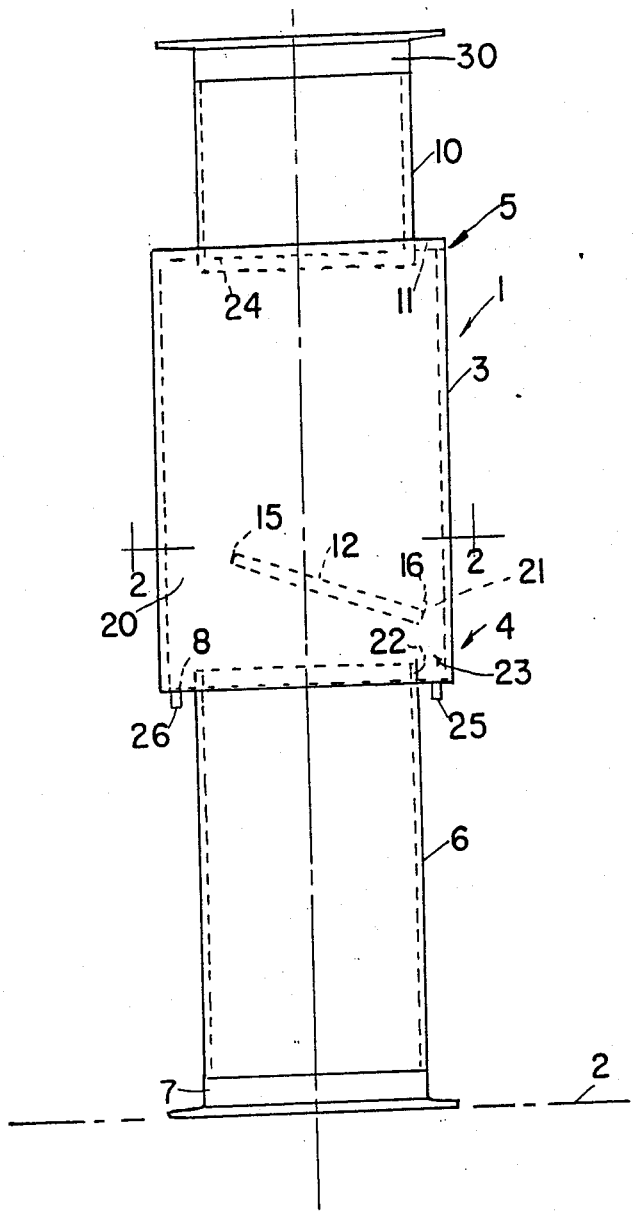
FIG. 1 is an elevational view of equipment incorporating the invention.

In FIG. 1, the equipment 1 mounted over the steam exit on the top wall 2 of a boiler.

The equipment includes the elongated cylindrically-shaped, vertically extending central member 3. The central member has a straight axis which is coaxial with the equipment of axis A. The bottom of the member 3 constitutes a steam entrance end 4 while the top of the member 3 constitutes a steam exit unit 5.

Below the central member 3 is an elongated, cylindrically-shaped, vertical extending steam inlet member 6 which has a straight axis coaxial with the axis A. The steam inlet member 6 is mounted on the top 2 of the boiler by the flange member 7. A ring 8 at the entrance end 4 is welded to both the bottom of the central member 3 and to the steam inlet member 6 and rigidly connects the members 3 and 6 together.

Disposed inside of the central member 3 is a flat, solid baffle member 12. The baffle member 12 has a pair of opposite connector edges 13 and 14 and upper and lower edges 15 and 16 extending between the connector edges. The connector edges 13 and 14 are welded to the interior wall of the central member 3.

It will be observed that the upper edge 15 and lower edge 16 are each spaced from the interior wall of the central member 3 to respectively form the upper space 20 and lower space 21.

The baffle 12 is oriented at an angle to the axis A. The orientation of the baffle is such that the upper edge 15 is disposed closer to the steam exit 5 than is lower edge 16.

The outside diameter of the steam inlet member 6 is smaller than the inside diameter of the central member 3 and the top end 22 of the steam inlet member 6 extends into the central member 3.

The steam entrance 4, the extension 22 of the ring 8, and the lower inside part of the central member 3 form receiver 23. The receiver is disposed adjacent to and below the lower space 21. In the embodiment shown, the receiver being formed from annular components, extends around the interior of the central member.

The outside diameter of the steam outlet member 10 is smaller than the inside diameter of the central member 3 and the lower end 24 of the outlet member extends into the central member 3.

Connected to the ring 8 of the receiver are a pair of pipes 25 and 26. The pipe 25 is adapted to be connected to a steam chest not shown and the pipe 26 is adapted to be connected to a sampler means also not shown.

The steam outlet member 10 has a flange member 30 by means of which the outlet member is connected to equipment with which the steam will be employed.

With the above in mind, I will now provide the material specifications and dimensions of equipment which I have successfully employed on a boiler for particle removal purposes.

The steam inlet member is made of schedule 40, 10" OD pipe having a length of approximately 36". This OD fits into a standard size boiler mounting flange. The central member is made of the same material with an OD of 16" and a length of approximately 24". The outlet member is identical to the inlet member except for length which is approximately 10".

With respect to the amount by which the ends 22 and 24 extend into the central member, 3, in the equipment being described the amount of the lower extension 22 was one inch and the amount of the upper retention 24 was ½ inch. My experience indicates that the minimum amount for a low extension, which is the most important of the two, should not be less than ½ inch.

The foregoing dimensions provide for a receiver having adequate capacity to carry off water and particles.

Regarding the baffle 12, the preferred angle is 30° with the upper limit being 45° and the lower limit 20°. The baffle is approximately 9 inches wide with the lower edge 16 spaced (at its center point) approximately ½ inch from the interior wall of the central member 3 while the upper edge 15 is spaced (at its center point) approximately 9 inches from the interior wall of the central member 3.

I do not have an exact theory as to why the equipment of the kind described above successfully removes the undesirable particles. Generally, however, the steam enters steam inlet member 6 and starts expansion as it reaches the central member 3. The expansion causes formation of water droplets. The soluable particles are dissolved in the water. Upon impinging in the underside of the baffle 12, the steam and droplets go into a swirling action up through the space 20 and above the baffle 12. At this point, insoluable particles separate out and the particles and droplets (with the soluable particles in solution) fall down on the top side of the baffle and thence out through the space 21 and down into the receiver 23. The water formed by the droplets conveys undissolved particles down the baffle.

The pipe 26 is connected to a sampler mechanism not shown which will measure the particle parts per million separated out and, thus provide an indication of the water purity.

The pipe 25 is connected to a steam trap wherein the impure water is collected and sent on for processing, for example, to a salt concentrator.

I claim:

1. Equipment to remove soluble and insoluble particles from the output steam of a steam boiler:
    an elongated, cylindrically-shaped central member having a straight axis, a steam entrance end, and a steam exit end; an elongated, cylindrically-shaped steam inlet member; means securing said steam inlet member to the steam entrance end of said central member
    an elongated, cylindrically-shaped steam outlet member; means securing said steam outlet member to the outlet end of said central member;
    a flat, solid baffle member disposed within said central member and having a pair of opposite connector edges, an upper edge and a lower edge respectively extending between the connector edges, the connector edges being connected to the interior wall of the central member and the upper and lower edges being spaced from the interior wall of the central member to respectively form an upper space and a lower space and the baffle member being oriented at an angle to the axis of the central member with said upper edge being disposed closer to said steam exit end than it is to the steam entrance end; and
    receiver means connected to said central member adjacent to and below said lower space to receive insoluable particles and water droplets with dissolved particles and convey the same outwardly of the equipment.

2. The equipment of claim 1 wherein said baffle member is disposed closer to said steam entrance end than to said steam exit end.

3. The equipment of claim 1 wherein said outlet member has a diameter smaller than the diameter of said central member.

4. The equipment of claim 3, wherein said outlet member projects inwardly of said central member.

5. The equipment of claim 1 wherein said inlet member has a diameter smaller than the diameter of said central member.

6. The equipment of claim 5 wherein said inlet member projects inwardly of said central member.

7. The equipment of claim 6 wherein: said receiver means is formed by (a) the portion of the steam inlet member projecting into said central member, (b) by said means securing said steam inlet member to said central member, and (c) by a portion of the inside wall of said central member.

* * * * *